US009318092B2

(12) United States Patent
Hetherington

(10) Patent No.: US 9,318,092 B2
(45) Date of Patent: Apr. 19, 2016

(54) NOISE ESTIMATION CONTROL SYSTEM

(71) Applicant: QNX Software Systems Limited, Kanata (CA)

(72) Inventor: Phillip Alan Hetherington, Port Moody (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 539 days.

(21) Appl. No.: 13/753,162

(22) Filed: Jan. 29, 2013

(65) Prior Publication Data

US 2014/0211966 A1 Jul. 31, 2014

(51) Int. Cl.
*H04B 15/00* (2006.01)
*G10K 11/178* (2006.01)

(52) U.S. Cl.
CPC ........ *G10K 11/178* (2013.01); *G10K 2210/108* (2013.01)

(58) Field of Classification Search
CPC ..... H04M 9/082; H04M 3/002; H04M 3/568; H04M 3/18; H04M 3/2236; H04M 3/56; H04M 1/6008; H04M 1/6041; H04M 1/6058; H04M 1/72569; H04R 3/005; H04R 1/1083; H04R 2410/07; H04R 2420/01; H04R 3/02; H04R 5/04; H03G 3/20; G10L 2021/02082; G10L 21/0232; G10L 25/78; G10L 21/0208
USPC ................ 379/94.1, 406.08, 392.01, 406.03, 379/406.05, 430, 93.05; 381/13, 317, 71.1, 381/71.4–85, 94.1–94.9
See application file for complete search history.

(56) References Cited

U.S. PATENT DOCUMENTS

| | | | | |
|---|---|---|---|---|
| 7,844,453 | B2 | 11/2010 | Hetherington | |
| 7,930,175 | B2 * | 4/2011 | Haulick | G10L 21/0208 381/71.2 |
| 2008/0027722 | A1 * | 1/2008 | Haulick | G10L 21/0208 704/226 |
| 2009/0052642 | A1 * | 2/2009 | Tackin et al. | 379/93.05 |
| 2009/0132248 | A1 * | 5/2009 | Nongpiur | G10L 21/0208 704/233 |
| 2010/0184487 | A1 * | 7/2010 | Takada | 455/569.1 |
| 2011/0019833 | A1 | 1/2011 | Kuech et al. | |
| 2011/0228946 | A1 * | 9/2011 | Chen et al. | 381/61 |
| 2013/0315403 | A1 * | 11/2013 | Samuelsson | 381/56 |
| 2014/0211966 | A1 * | 7/2014 | Hetherington | G10K 11/178 381/94.3 |

OTHER PUBLICATIONS

Le Bouquin Jeannès et al.; "Combined Noise and Echo Reduction in Hands-Free Systems: A Survey"; IEEE Transactions on Speech and Audio Processing, vol. 9, No. 8; XP-002335495; Nov. 2001; pp. 808-220.

* cited by examiner

*Primary Examiner* — Akelaw Teshale
(74) *Attorney, Agent, or Firm* — Brinks Gilson & Lione

(57) ABSTRACT

A noise estimation control system may limit increases of a stored background noise estimate in response to a detected noise feedback situation. The system receives an input audio signal detected within a space, and a reference audio signal that is transmitted by a speaker as an aural signal into the space. A signal processor processes the input audio signal and the reference audio signal to determine a coherence value based on an amount of the aural signal that is included in the input audio signal. The signal processor also calculates an amount to adjust the stored background noise estimate based on the coherence value and a determined background noise level of the input audio signal.

20 Claims, 8 Drawing Sheets

NOISE ESTIMATION CONTROL SYSTEM

BACKGROUND

1. Technical Field

This application relates to sound processing and, more particularly, to controlling the adjustment of a stored background noise estimate.

2. Related Art

In a communication system, signal feedback between a speaker and a microphone may reduce the overall sound quality of the system. Some communication systems attempt to manage feedback by applying various audio processing techniques. For example, a two-way communication system may apply echo cancellation to reduce feedback of speech and noise content. Echo cancellation suppresses far side signal content that has been fed back into the near side microphone. When far side noise content dominates the near side microphone, the signal may be gated to prevent noise feedback. Gating typically applies a large amount of noise suppression to the audio signal. For some types of audio signals, gating may distort the signal and produce undesirable results.

Some systems use a voice activity detector to determine whether to apply echo cancellation or to gate the captured microphone signal. When the voice activity detector does not identify voice in the microphone signal, the system may gate the microphone signal to reduce the amount of noise transmitted back to the far side receiver. For some types of audio signals, the voice activity detector may help control the feedback loop problem and maintain the background noise level in the system. However, for other types of audio signals, the use of a voice activity detector may not accurately recognize the signal. In these systems, the voice activity detector may not improve the performance of the system's background noise estimator. However, when a voice activity detector is not used in some systems, a feedback loop may occur which could result in a continually growing background noise level in the system.

BRIEF DESCRIPTION OF THE DRAWINGS

The system may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

A communication system may include a background noise estimator to estimate a background noise level in the system. The system stores the background noise estimate for use in other sound processing algorithms. For example, the background noise estimate may be used to calculate a signal-to-noise ratio (SNR). The system may adjust the stored background noise estimated over time to provide a more accurate noise estimate as background noise conditions change. In noise feedback situations, when the far side noise content dominates the near side content of a captured microphone signal, the background noise estimate may be incorrect as it includes both the near and far side noise sources. Some communication systems, such as systems that focus on transmitting only voice and noise content, attempt to reduce this concern by gating the noise so that the background noise estimate calculation is not erroneously adjusted in response to the far side feedback noise. Other communication systems may provide for the reliable transmission of voice, noise, and other content, such as music. The addition of music content to the communication path introduces additional complexities. For example, a system that transmits music content may elect not to gate the signal in a noise feedback situation because gating may distort the music and produce undesirable results. However, without gating, the far side noise may feedback into the system causing the background noise estimate to mistakenly track a growing noise floor.

The systems described herein use a feedback detector to identify signal feedback situations and limit the growth of the background noise estimate when the growth would be caused by far side signal content being fed back into the near side microphone signal. The system receives an input audio signal detected within a space, and a reference audio signal that is transmitted by a speaker as an aural signal into the space. A signal processor processes the input audio signal and the reference audio signal to determine a coherence value based on an amount of the aural signal that is included in the input audio signal. The signal processor calculates an amount to adjust the stored background noise estimate based on the coherence value and a determined background noise level of the input audio signal. When feedback is detected, the growth of the background noise estimate may be limited or capped.

Figure 1:
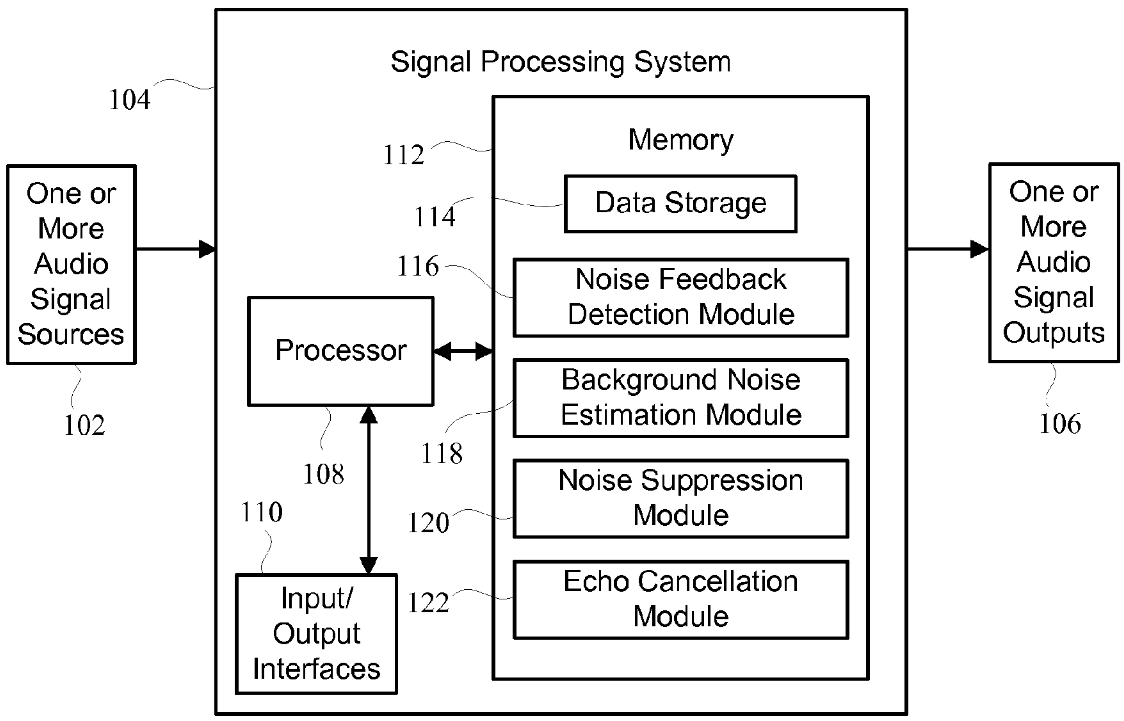
FIG. 1 illustrates a signal processing system.

FIG. 1 illustrates a system that includes one or more audio signal sources 102, one or more signal processing systems 104, and one or more audio signal outputs 106. The signal processing system 104 receives an input audio signal from the audio signal source 102, processes the signal, and outputs an improved version of the input signal to the audio signal output 106. In one implementation, the output signal received by the audio signal output 106 may include less noise than the input signal received by the speech processing system 104. The audio signal source 102 may be a microphone, an incoming communication system channel, a communication system receiver, a pre-processing system, or another signal input device. The audio signal output 106 may be a loudspeaker, an outgoing communication system channel, a communication system transmitter, a speech recognition system, a post-processing system, or any other output device.

The signal processing system 104 includes one or more processors 108, one or more input/output interfaces 110, and one or more memory devices 112. The input/output interfaces 110 may be used to connect the signal processing system 104 with other devices, processing systems, or communication paths internal or external to the system. The input/output interfaces 110 connect the signal processing system 104 with the audio signal sources 102 and the audio signal outputs 106. As one example, the signal processing system 104 may include an input interface that connects the system with a microphone. As another example, the signal processing system 104 may include an input interface that connects with a node on a signal path, such as a node on a signal path that carries a signal received from a far side communication system. As yet another example, the signal processing system 104 may include an output interface that connects the system with a communication system transmitter or a voice recognition system.

The processor 108 may be a computer processor, a signal processor, or both. The processor 108 may be implemented as a central processing unit (CPU), microprocessor, microcontroller, application specific integrated circuit (ASIC), or a combination of circuits. In one implementation, the processor 108 is a digital signal processor ("DSP"). The digital signal processor may include a specialized microprocessor with an architecture optimized for the fast operational needs of digital signal processing. Additionally, in some implementations, the digital signal processor may be designed and customized for a specific application, such as an audio system of a vehicle or a signal processing chip of a mobile communication device (e.g., a phone or tablet computer). The memory device 112 may include a magnetic disc, an optical disc, RAM, ROM, DRAM, SRAM, Flash and/or any other type of computer memory. The memory device 112 is communicatively coupled with the computer processor 108 so that the computer processor 108 can access data stored on the memory device 112, write data to the memory device 112, and execute programs and modules stored on the memory device 112.

The memory device 112 includes one or more data storage areas 114 and one or more programs. The data and programs are accessible to the computer processor 108 so that the computer processor 108 is particularly programmed to implement the signal processing functionality of the system. The programs may include one or more modules executable by the computer processor 108 to perform the desired functions. For example, the program modules may include a noise feedback detection module 116, a background noise estimation module 118, a noise suppression module 120, and an echo cancellation module 122. The memory device 112 may also store additional programs, modules, or other data to provide additional programming to allow the computer processor 108 to perform the functionality of the signal processing system 104. The described modules and programs may be parts of a single program, separate programs, or distributed across multiple memories and processors. Furthermore, the programs and modules, or any portion of the programs and modules, may instead be implemented in hardware or circuitry.

Figure 2:
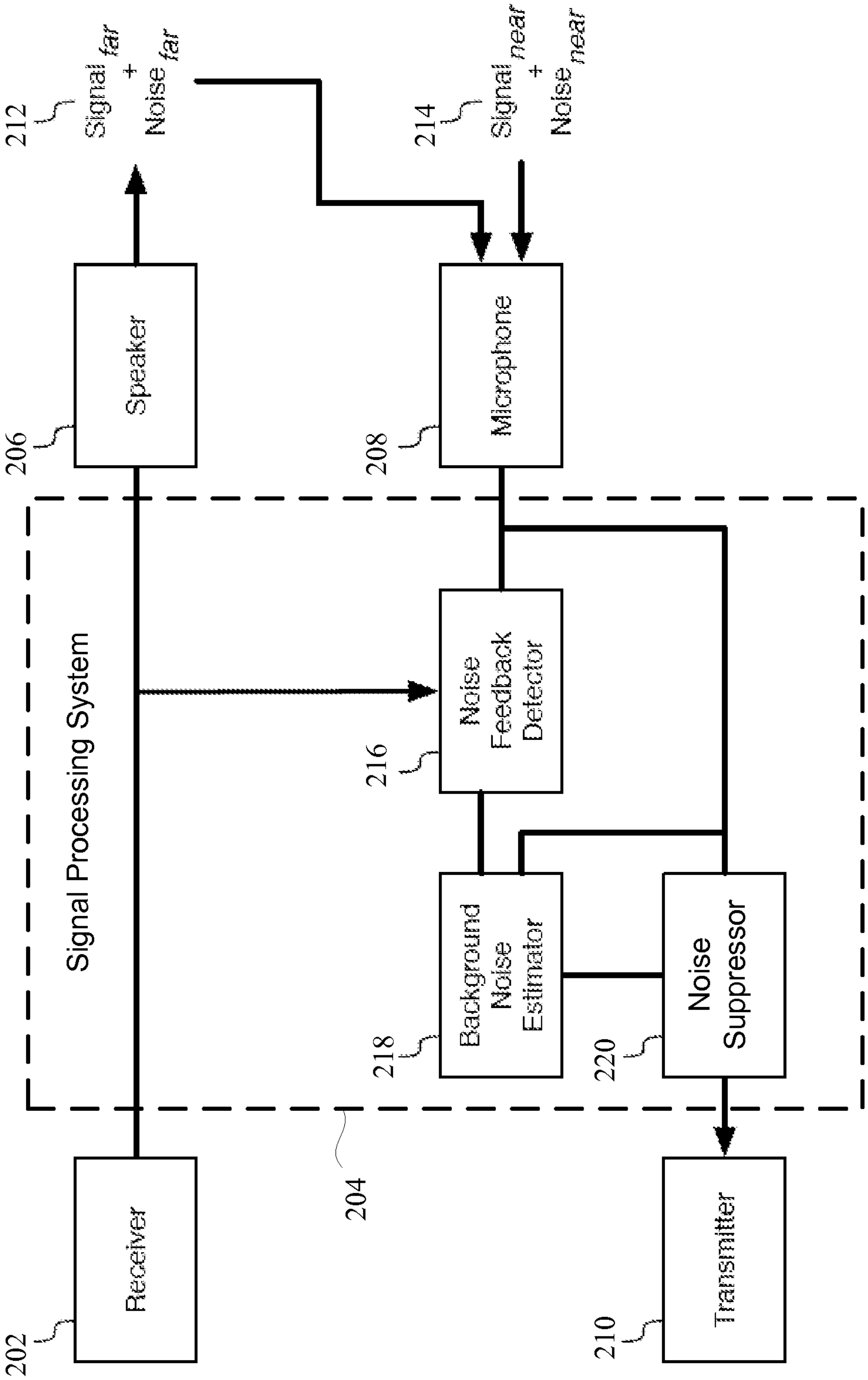
FIG. 2 illustrates the signal processing system of FIG. 1 in a two-way communication system.

FIG. 2 illustrates the signal processing system of FIG. 1 in a two-way communication system. The communication system of FIG. 2 includes one or more receivers 202, one or more signal processing systems 204, one or more speakers 206, one or more microphones 208, and one or more transmitters 210. In the implementation of FIG. 2, the receiver 202, signal processing system 204, speaker 206, microphone 208, and transmitter 210 are components of an audio communication device, such as a phone, mobile communication device, smartphone, computer, laptop, or tablet. As one example, the components of FIG. 2 are used in an audio or video conferencing system. As another example, the components of FIG. 2 are used as part of a hands-free communications system, such as in a vehicle.

During operation, the receiver 202 receives incoming audio signals from a far side communication device. The incoming audio signal may include speech, noise, and/or other audio content, such as music content. The receiver 202 passes the incoming audio signal to the speaker 206, with or without modification or application of any pre-processing or signal conditioning techniques. The speaker 206 receives the incoming audio signal and transmits the signal as an aural signal 212 into a space, such as a room, vehicle cabin, outdoors, or another open, closed, or partially enclosed space. The reproduced aural signal 212 transmitted from the speaker 206 contains a mix of signal and noise content received from the far side device.

When detecting the sound environment within the space, the microphone 208 captures a near side signal 214, such as the voice of a near side talker, along with some of the aural signal 212 played out from the speaker 206. The near side signal 214 may include speech, noise, and/or other audio content, such as music content. The combined signal captured by the microphone 208 may be processed by the signal processing system 204 and sent to the transmitter 210 before being output from the transmitter 210 to the far side communication device via a communication network.

The signal processing functionality of FIG. 2 may be achieved by the computer processor 108 accessing data from data storage 114 of FIG. 1 and by executing one or more of the modules 116-122 of FIG. 1. For example, the processor 108 may execute the noise feedback detection module 116, the echo cancellation module 124, or both at a noise feedback detector 216. The processor 108 may also execute the background noise estimation module 118 at a background noise estimator 218, and may execute the noise suppression module 120 at a noise suppressor 220. Any of the modules or devices described herein may be combined or divided into a smaller or larger number of devices or modules than what is shown in FIGS. 1 and 2.

The signal processing system 204 includes the noise feedback detector 216, the background noise estimator 218, the noise suppressor 220, and any number of other signal processing stages. The signal captured by the microphone 208 is received by the noise feedback detector 216. The noise feedback detector 216 uses a coherence or correlation calculation to determine how much of the aural signal 212 (e.g., content from the far side communication system) is being fed back into the captured microphone signal. The coherence or correlation calculation may be based on information from an acoustic echo canceller. Thus, the noise feedback detector 216 may include an acoustic echo canceller to analyze the input audio signal (e.g., microphone signal) and a reference signal (e.g., a copy of an audio signal before it is played out from the speaker) to determine the amount of the reference signal that was captured in the input audio signal. Alternatively, the noise feedback detector 216 may be coupled with a separate acoustic echo canceller that analyzes the input and reference signals.

The background noise estimator 218 calculates an estimate of a background noise level in the space where the microphone 208 is located. Over time, the background noise estimator 218 may adjust the parameters of the background noise calculation to include the current captured signal content in the calculation. The background noise estimator 218 utilizes a feedback detection calculation from the noise feedback detector 216 to limit the growth of the background noise estimate when the captured microphone signal contains feedback. The growth limit may be applied when the amount of feedback exceeds a threshold or may be applied proportionally to the amount of detected feedback.

In one implementation, the signal processing system 204 controls the background noise growth level without use of a voice activity detector (VAD) because the captured microphone signal may include more than just speech and noise (e.g., the captured signal may also include music). In other implementations, the system may also include a voice activity detector to supplement the noise feedback detector 216 to provide an additional data input to the background noise estimator 218. The background noise estimator 218 may use this voice activity information as part of the noise estimation process in some situations, or may ignore the voice activity information in other situations in favor of the noise estimation limits controlled by the noise feedback detector 216. Using the noise feedback detector 216 to control an increase of a background noise estimate, in addition to or in place of the voice activity detection control, may improve overall system performance when the input signal includes music or when the far side signal has a high level of noise that is not gated. In these situations, the noise feedback detector 216 helps prevent a noise feedback loop that results in continuous increases to the noise estimate.

After the system has processed the signal captured by the microphone 208, the microphone signal may be passed to the noise suppressor 220 before being transmitted to the far side communication device via the transmitter 210. The noise suppressor 220 may use a Wiener filter to handle noise suppression. The noise suppressor 220 may receive an output from the background noise estimator 218 and suppress noise in the input audio signal captured by the microphone based on the stored background noise estimate. Thus, the noise suppressor 220 may generate an output signal with reduced noise content for transmission to the far side communication system.

In some implementations, the system only includes one near side microphone. In other implementations, the system may include multiple near side microphones. In systems with two or more microphones, the multiple resulting signal channels may be analyzed separately by the noise feedback detector 216. If the noise feedback detector 216 detects more feedback in one microphone signal channel than another, then the system may suppress the channel with more feedback to a greater degree than the other channels with less feedback. In this situation, the resulting stereo image associated with the channels may wander due to the imbalance of noise suppression levels. To reduce the stereo wander in this situation, audio may be borrowed from the microphone signal channels that have less feedback. For example, the energy ratio of the channels may be measured before signal processing and after signal processing. The system may then rebalance the relative energies of the channels by borrowing audio to maintain the pre-processing energy ratio.

The system may also execute independent background noise estimates on each captured microphone channel. If the background noise estimate for one channel is higher than the other channel(s), the system may force the higher noise estimate down. Alternatively, the system may use the lower or minimum background noise estimate for multiple captured microphone signal channels. In one example, the independent noise estimates each calculate their own growth or upward-adaptation rates. The system may then set both channels to the lower of the two growth rates. If one noise estimate is adapting up because it is closely coupled to the echo on a nearby speaker and the microphone further away from the echo is not adapting up, then both estimates may be limited from increasing because the system assumes the increase or decrease of noise should be common to both channels. In one implementation, the noise estimate of each channel is set to the minimum noise estimate of both channels. In another implementation, the adaptation of the noise estimate of each channel is set to the minimum adaptation of both channels. This implementation allows one noise estimate to be slightly higher than the others if it corresponds to a microphone with a different sensitivity or if it experiences a greater degree of noise, such as if it is in close proximity to a system fan or the like.

In systems with multiple microphones, where the noise estimate and/or adaptation rates of one channel are adjusted in view of another channel, the system may reduce the higher estimate or rate based on any difference from the other channel. Alternatively, the system may only reduce the higher estimate or rate when the difference between channels is greater than a predetermined threshold (e.g., a threshold between 1 dB and 5 dB, a threshold between 2 dB and 4 dB, a threshold between 2.5 dB and 3.5 dB, or a threshold at or around 3 dB). This threshold based comparison of the multiple microphone channels may be performed after the feedback correlation-based noise estimates are completed.

Figure 3:
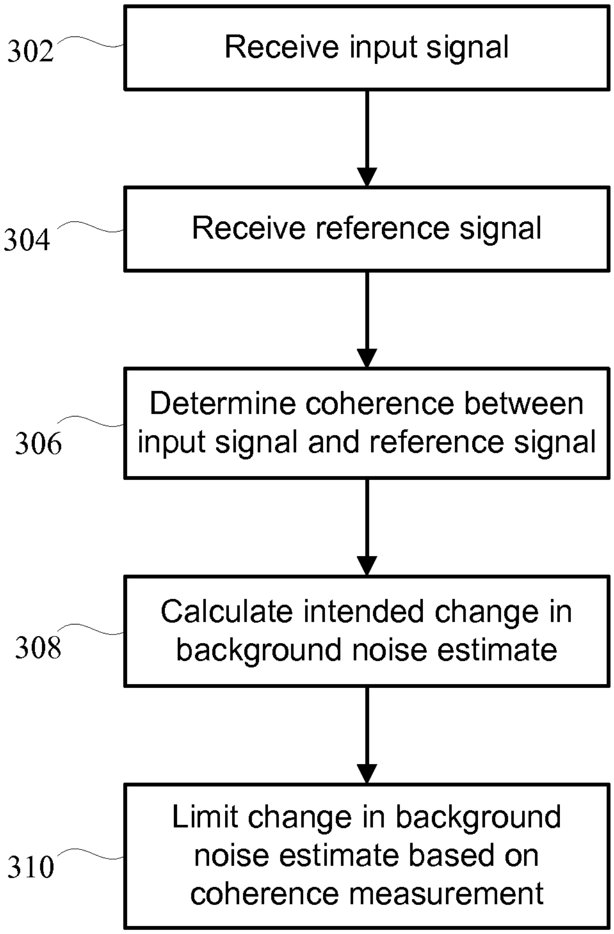
FIG. 3 illustrates one implementation of a method of controlling the adjustment of a stored background noise estimate.

FIG. 3 illustrates one implementation of a method of controlling the adjustment of a stored background noise estimate. The method of FIG. 3 may be implemented by the signal processing components of FIG. 2, such as the noise feedback detector 216 and the background noise estimator 218. At step 302, an input audio signal is received. For example, the input audio signal is received from the microphone 208 and may include portions of the near side signal 214 and portions of the aural signal 212. At step 304, a reference audio signal is received. For example, the reference audio signal is received from a node on the audio path between the receiver 202 and the speaker 206.

At step 306, a coherence measurement between the input signal and the reference signal is determined. The coherence value represents a degree of similarity between the input signal and the reference signal. In one implementation, the coherence value is a number between zero and one. A coherence value of zero would indicate no or virtually no coherence between the input signal and the reference signal. A coherence value of one would indicate a match or virtual match between the input signal and the reference signal. A coherence value above zero but below one would indicate some degree of similarity and some degree of difference between the input signal and the reference signal. A coherence value closer to one than zero indicates more similarities between the signals than a coherence value closer to zero than one. Although the coherence value is described herein as being between zero and one, the coherence value could also be adjusted to any other range. For example, the coherence value could be calculated to span a range from zero to ten, zero to one hundred, one hundred to two hundred, or the like.

At step 308, an intended change in a stored background noise estimate is calculated. The stored background noise estimate and any intended changes may be calculated according to several different noise estimation techniques. In one implementation, the stored background noise estimate is calculated according to the techniques described in U.S. Pat. No. 7,844,453, which is incorporated herein by reference. In other implementations, other known background noise estimation techniques are used to determine the stored background noise estimate and any intended changes independently of the coherence-based limiting described herein. The noise estimation techniques analyze the current input signal and if the signal looks like the noise estimate and/or is fairly steady state and not fluctuating, then it is more likely noise and therefore the stored noise estimate may be allowed to adapt in view of the current signal.

At step 310, the intended change in the stored background noise estimate is limited based on the coherence measurement. In systems where the coherence value is a number between zero and one, the system may set the amount to adjust the stored background noise estimate according to $A=B(1-C)$, where A represents the amount to adjust the stored background noise estimate, B represents the intended increase to the stored background noise estimate based on the background noise level in the input audio signal, and C represents the coherence value. The equation may be adjusted if the coherence value spans a different range. For example, if the coherence value spans the range of zero to one hundred, then the system may use A=B((100−C)/100) to set the noise estimate adjustment. The equation may also be adjusted to achieve other system goals, such as allowing higher or lower noise adaption rates in some situations. Additionally, the system may set a predetermined threshold and only limit the intended change of the stored background noise estimate when the coherence value is above the threshold. For example, the system may set the threshold to 0.3 and allow the intended change to the stored noise estimate to occur without being reduced according to the A=B(1−C) adaption limiting equation when the coherence value is below 0.3. In this example, the system may apply the A=B(1−C) limiting equation only when the coherence value exceeds the threshold. Furthermore, in other implementations, the system may establish a function relating coherence to noise estimate adaptation according to other inverse functions of C, such as $A=B(1-C)^2$, $A=B(1-C)^4$, or the like.

The method of FIG. 3 calculates the correlation value based on a comparison between the input audio signal from the microphone and the reference signal. This type of coherence measurement is known as open-loop coherence and may be a strong measure of coherence in small rooms, in vehicles, in other spaces with a direct acoustic path, and where there is good alignment of the reference signal and the input audio signal. In order to accommodate other situations, such as larger rooms, some implementations may use a different coherence measurement that is based on a comparison between the input signal and a predicted echo signal. The predicted echo signal is calculated based on a filter that takes time into account. The use of the predicted echo signal to determine a coherence value is described in connection with FIG. 4.

Figure 4:
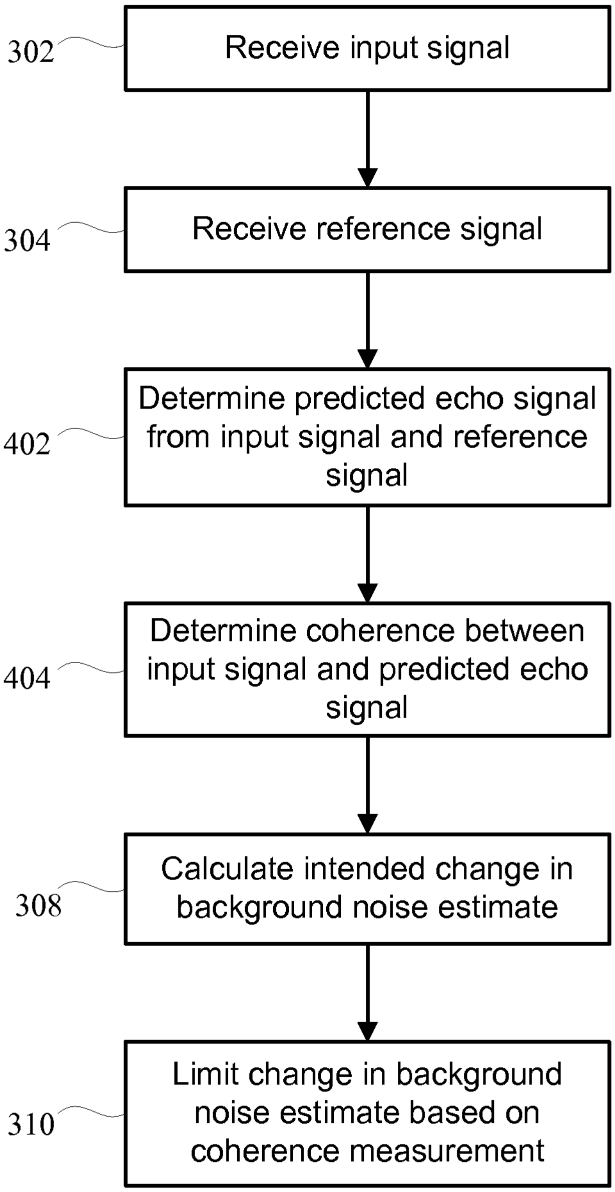
FIG. 4 illustrates another implementation of a method of controlling the adjustment of a stored background noise estimate.

FIG. 4 illustrates another implementation of a method of controlling the adjustment of a stored background noise estimate. The method of FIG. 4 may be implemented by the signal processing components of FIG. 2, such as the noise feedback detector 216 and the background noise estimator 218. At steps 302 and 304, an input audio signal and a reference signal are received, as described above in connection with FIG. 3. Additionally, at steps 308 and 310, an adjustment to a stored background noise estimate is determined based on a coherence measurement, as described above in more detail in connection with FIG. 3. The method of FIG. 4 differs from the method of FIG. 3 in the calculation of the coherence measurement, which occurs at steps 402 and 404 of FIG. 4.

At step 402, a predicted echo signal (D) is determined from the input audio signal (Y) and the reference signal (X). The predicted echo signal (D) is a complex spectrum resulting from an echo canceller. Specifically, the predicted echo signal may be a result of a convolution between the reference signal (X) and an echo suppression filter (H). The output of the echo canceller is D−Y.

At step 404, a coherence measurement between the input audio signal (Y) and the predicted echo signal (D) is determined Coherence at any one frequency is calculated by looking at the values of D and Y across a short vector of N bins (e.g., between 2 and 20 bins) centered around the bin of interest. In one implementation, five bins are used (e.g., frequency bin of interest +/− two bins). The coherence at frequency bin i is computed from the complex spectrum of real and imaginary values of across a range of n frequencies from D and Y centered around frequency bin i, according to the following equations:

$$SumDY_{Rei} = \sum_{j=0}^{n} [(D_{Rei} * Y_{Rei}) + (D_{Imi} * Y_{Imi})]$$

$$SumDY_{Imi} = \sum_{j=0}^{n} [(D_{Imi} * Y_{Rei}) - (D_{Rei} * Y_{Imi})]$$

$$SumDD_i = \sum_{j=0}^{n} [(D_{Rei} * D_{Rei}) + (D_{Imi} * D_{Imi})]$$

$$SumYY_i = \sum_{j=0}^{n} [(Y_{Rei} * Y_{Rei}) + (Y_{Imi} * Y_{Imi})]$$

$$CohDY_i = \frac{(SumDY_{Rei} * SumDY_{Rei}) + (SumDY_{Imi} * SumDY_{Imi})}{SumDD_i * SumYY_i}$$

The resulting CohDY vector may or may not be smoothed across the frequency spectrum. For example, some implementations may perform a minimal smoothing that increases with frequency.

In the methods of FIGS. 3 and 4, one coherence value may be determined for the full bandwidth of the input signal and the coherence-based noise estimate adaption may occur for the full noise estimate based on that one coherence value. Alternatively, the system may determine multiple coherence values for sub-portions of the input signal, and then apply multiple coherence-based adaption limits to specific sub-portions of the noise estimate.

In one implementation, the system divides the input audio signal into a plurality of frequency bands. Each of the frequency bands comprises a plurality of frequency bins. For a first frequency band, a first bin coherence value is calculated for a first frequency bin in the first frequency band based an amount of the aural signal transmitted from the speaker that is included in the first frequency bin of the microphone input signal. A second bin coherence value is then calculated for a second frequency bin in the first frequency band based an amount of the aural signal that is included in the second frequency bin of the microphone input signal. Additional bin coherence values may also be calculated for the first frequency band if the band includes additional frequency bins. When the bin coherence values are available, the system may average the first bin coherence value with the second bin coherence value and any other bin coherence values associated with the first frequency band to determine a band coherence value for the first frequency band. The band coherence value is then used to control the adaptation of a frequency band of a stored background noise estimate that corresponds to the first frequency band of the input signal. Specifically, the system calculates an amount to adjust the stored background noise estimate in the frequency band that corresponds to the first frequency band of the input audio signal based on a background noise level in the first frequency band and the band coherence value for the first frequency band.

In one implementation, the coherence/correlation calculation may be bin/bin, and in the background noise estimation module it may be applied in a band/band fashion (e.g., about five to nine bands, depending on the audio bandwidth). The system may take the root-mean-square of the coherence values across all contributing bins within a band. A decay value is calculated as 1−MeanSqr(Coherence) and then the calculated adaptation of the estimate in dB (or in CdB, which is 100th of a dB)/frame is multiplied by this decay value. Therefore, if all bins within a band have a correlation of 1, then the root-mean-square for this band would be 1, and the decay would be 0, thus indicating that the stored noise estimate will not adapt at all. As another example, if the noise estimate wants to adapt up by 1.5 dB based on the current noise level in the input signal, and the MeanSqr coherence is 0.75, then the decay value will be 0.25 and the noise estimate in that band adapts up in this case by about 0.375 db (0.25×1.50 dB). In some implementations, this adaption is only done when the signal-to-noise ratio in that band is positive (which is when the noise estimate would adapt up). Thus, the system establishes an inverse relationship between noise estimate adaptation and the coherence measurement between the input microphone signal and the predicted echo signal (or the reference signal).

Figure 5:
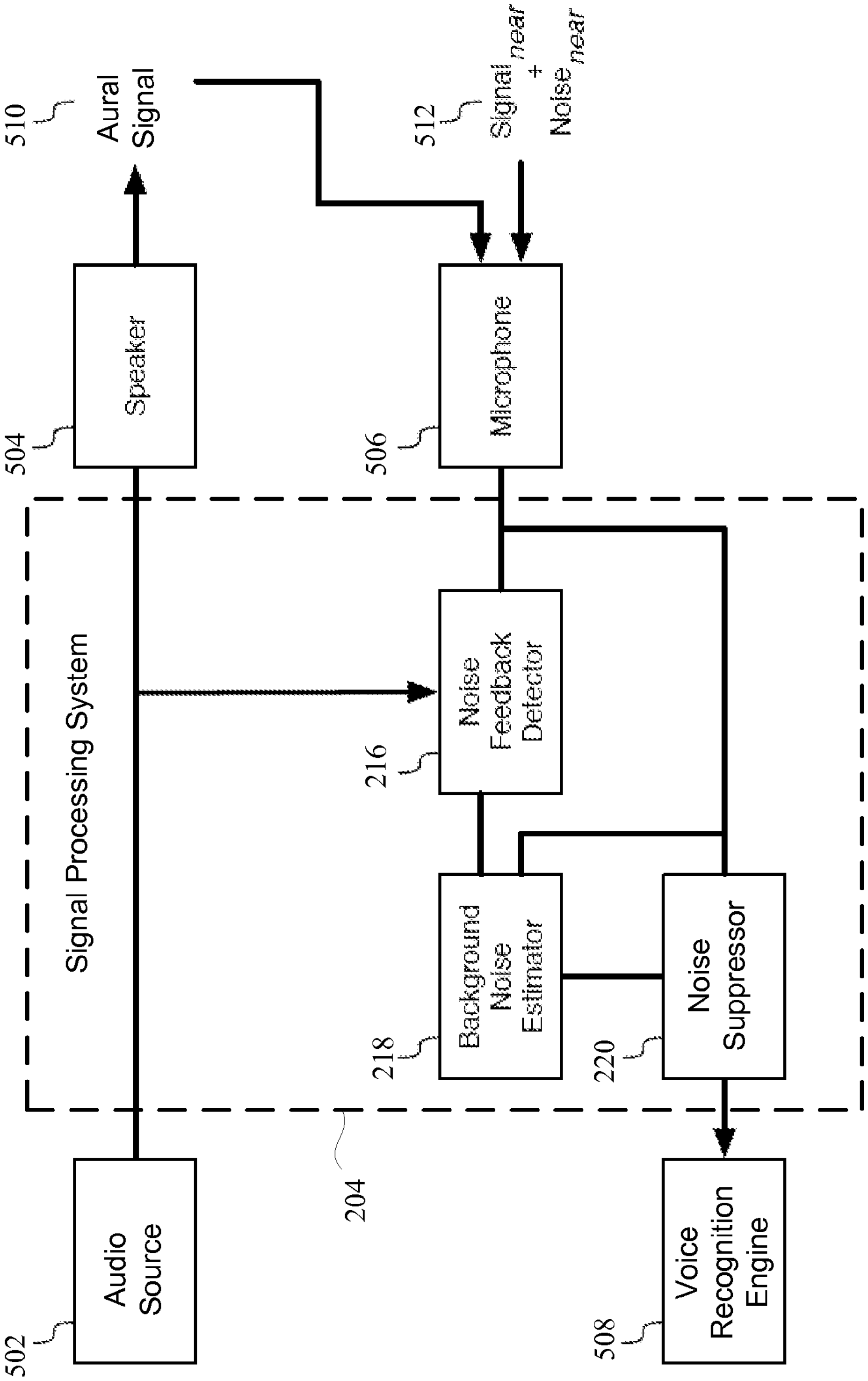
FIG. 5 illustrates the signal processing system of FIG. 1 in a voice recognition system.

FIG. 5 illustrates the signal processing system of FIG. 1 in a voice recognition system. The system of FIG. 5 includes one or more audio sources 502, one or more signal processing systems 204, one or more speakers 504, one or more microphones 506, and one or more voice recognition engines 508. The implementation of FIG. 5 uses the signal processing system 204, as described above in connection with FIG. 2, in connection with a voice recognition system, such as a voice recognition system that may operate in the presence of music. As one example, the speaker 504 may play music received from the audio source 502 during a voice recognition session. The music is output as an aural signal 510 from the speaker into a space. If the music is fed back into the system via the microphone 506 located in the vicinity of the speaker 504, then the system may cancel the echo prior to feeding the microphone signal to the voice recognition engine 508. If the noise estimate at the background noise estimator 218 rises too high, then it is possible that voice commands included in the signal 512 when passed to the voice recognition engine 508 may be masked by comfort noise inserted by the system after echo cancellation. The signal processing system 204 may use the noise feedback detector 216 to slow the noise estimation rise based on a detected correlation between the reference audio signal (e.g., the signal transmitted from the speaker 504) and the signal captured by the microphone 506. The music may then be removed from the microphone signal and cleaner commands may be provided to the voice recognition engine 508.

Figure 6:
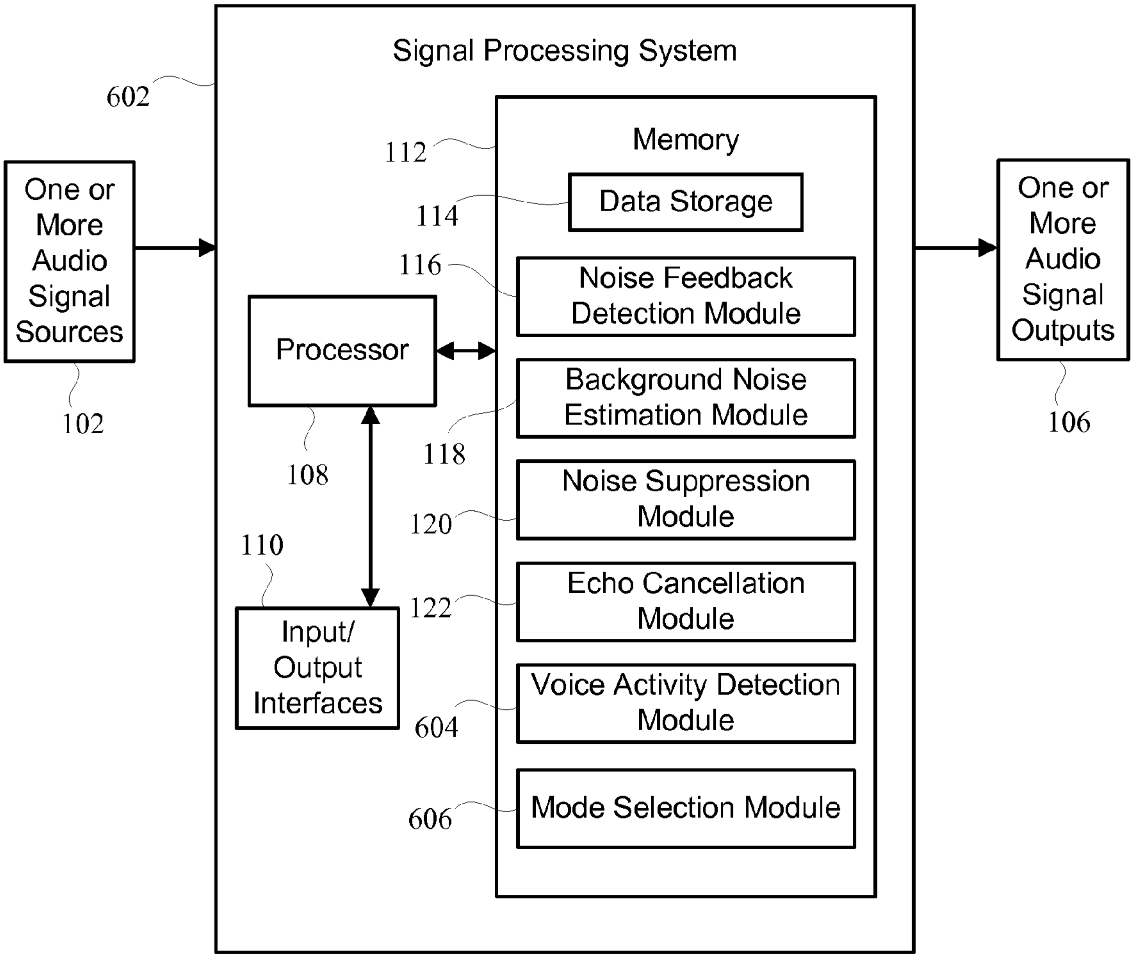
FIG. 6 illustrates an alternative signal processing system.

FIG. 6 illustrates an alternative signal processing system 602. The signal processing system 602 interfaces with one or more audio signal sources 102 and one or more audio signal outputs 106 through the input/output interfaces 110, as described in connection with FIG. 1. The signal processing system 602 also includes one or more processors 108 that access one or more memory device 112 to gain access to stored data or stored programs, such as the data in data storage 114 and the programs of the modules 116, 118, 120, and 122, as described in connection with FIG. 1. FIG. 6 differs from FIG. 1 based on the inclusion of additional functionality and modules in the signal processing system 602. For example, the signal processing system 602 includes a voice activity detection module 604 and a mode selection module 606 that are executable by the computer processor 108 to perform the desired functions.

Figure 7:
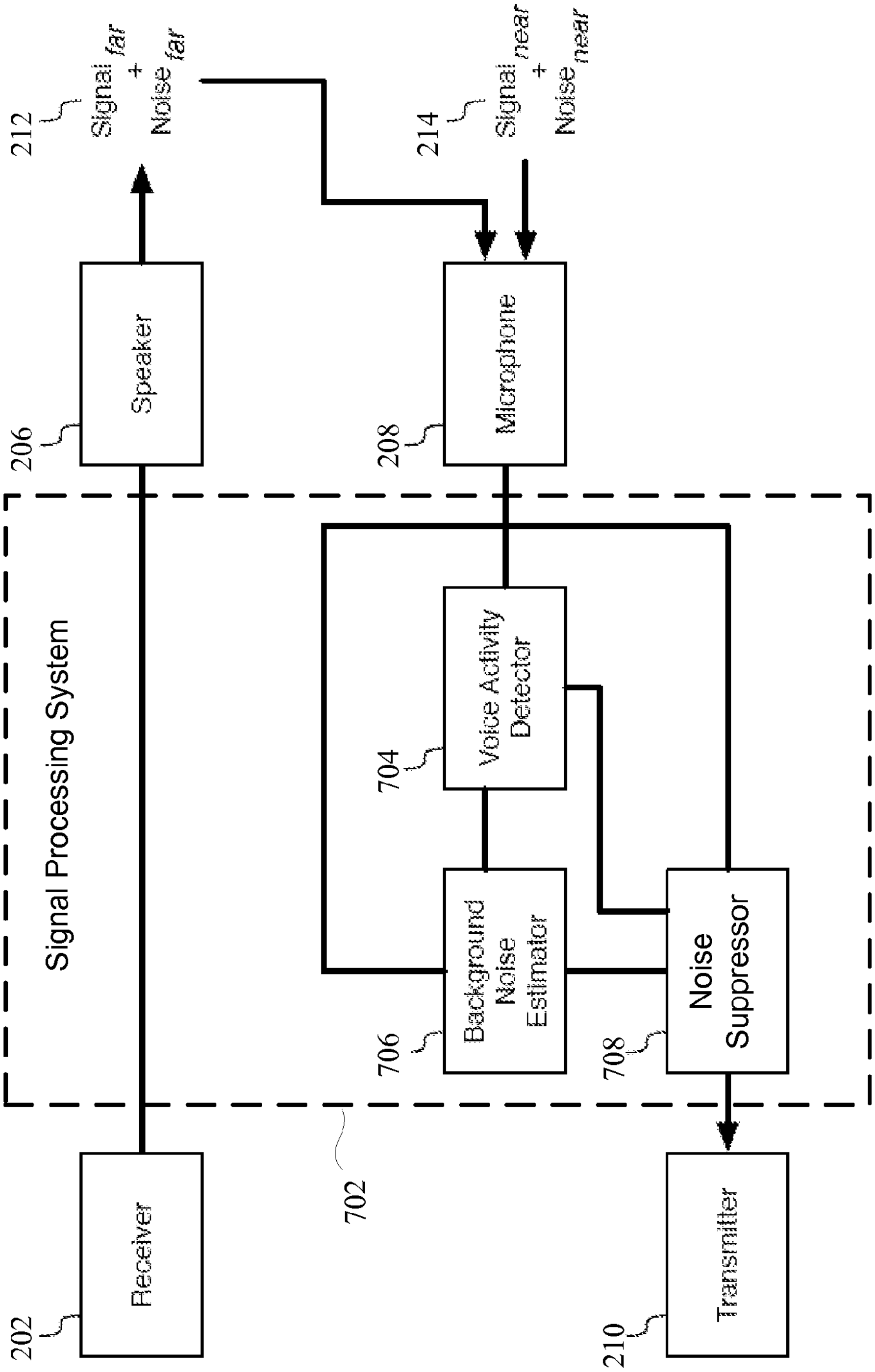
FIG. 7 illustrates the signal processing system of FIG. 6 in a two-way communication system.

FIG. 7 illustrates the use of the voice activity detector module 604 of the signal processing system 602 of FIG. 6 in a communication system. The communication system of FIG. 7 includes one or more receivers 202, one or more speakers 206, one or more microphones 208, and one or more transmitters 210, as described above in connection with FIG. 2. The speaker 206 produces the aural signal 212 and the microphone captures portions of the aural signal 212 and the near side signal 214, as described above in connection with FIG. 2. In the signal processing system 702 of FIG. 7, the system focuses on voice and noise content (as opposed to other content, such as music) and processes the captured microphone signal with a voice activity detector 704, a background noise estimator 706, and a noise suppressor 708. The voice activity detector 704 may classify the captured microphone signal as voice or noise. The background noise estimator 706 calculates an estimate of the background noise. When the voice activity detector 704 indicates non-voice content, or noise, the background noise estimator 706 may adjust the parameters of the background noise calculation to include the current captured microphone signal content in the calculation. When the voice activity detector 704 indicates noise, the noise suppression module 118 may gate the captured signal content so that noise is not sent via the transmitter 210 to the far side communication device. The noise suppressor 708 may use a Wiener filter to handle noise suppression but may apply further noise suppression or gating based on the indication of high noise from the voice activity detector 704. The gating may simply allow the noise suppression gains to be unlimited or a large limit (e.g., beyond 10 dB of suppression). As discussed above, a voice activity detector 704 may not operate correctly when music content is present and gating may adversely impact the sound quality of a system that transmits music content. Thus, the system of FIG. 7 may be used when the system plans to send voice and noise content, but the system of FIG. 2 may be preferable when the system plans to send voice, noise, and music content.

Figure 8:
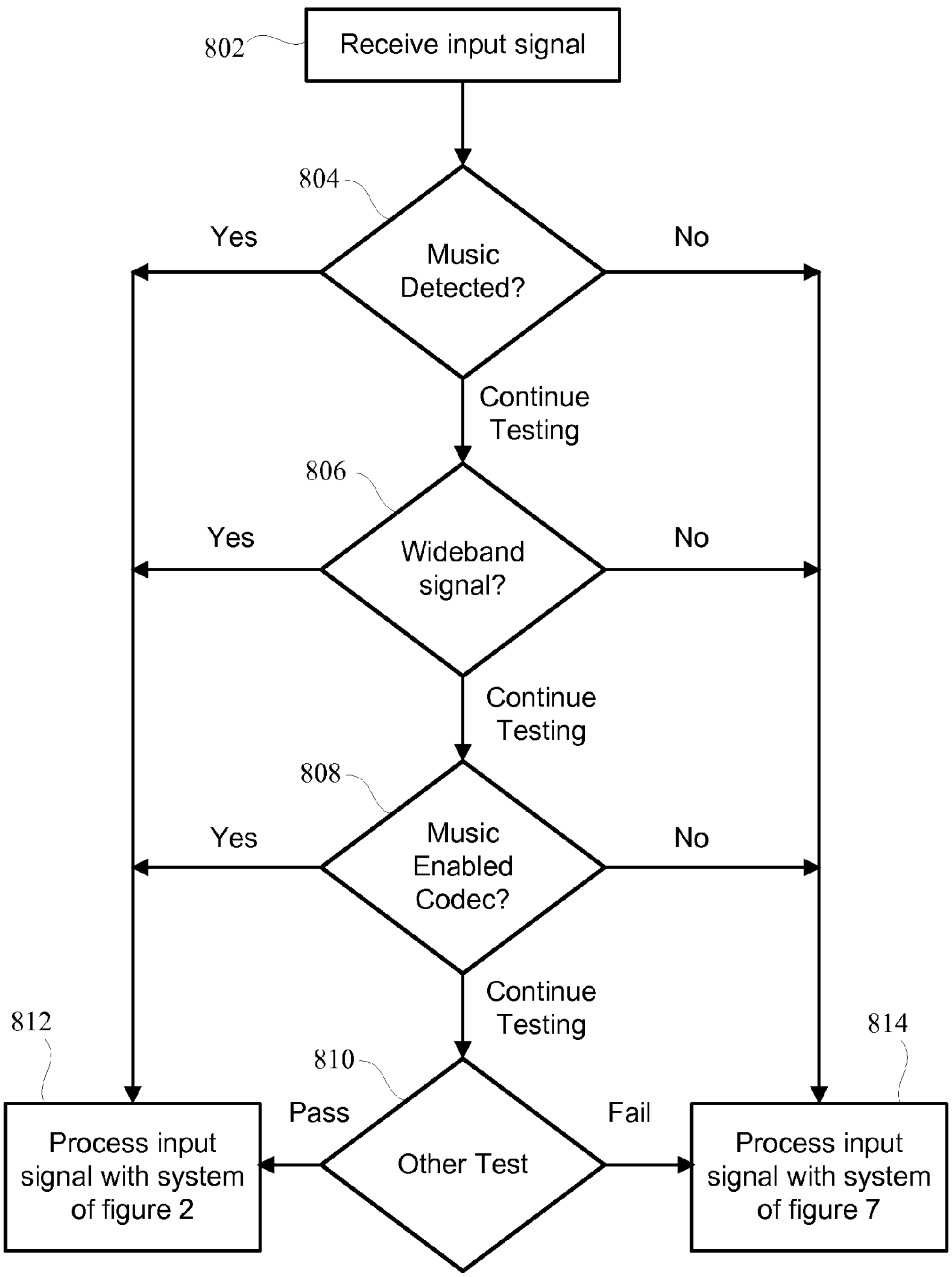
FIG. 8 illustrates another method of controlling the adjustment of a stored background noise estimate.

FIG. 8 illustrates the use of the mode selection module 606 of the signal processing system 602 of FIG. 6 to select when the system of FIG. 2 is used and when the system of FIG. 7 is used to control the adaptation of the stored background noise estimate. At step 802, an input audio signal is received, such as a signal captured by a microphone. After the input signal is received, the signal is processed or system characteristics are analyzed to determine whether background noise estimate control based on the system of FIG. 2 or FIG. 7 is more likely to produce favorable results. For example, the signal is processed or system characteristics are analyzed in one or more of steps 804, 806, 808, or 810. The decision on whether to use the system of FIG. 2 or FIG. 7 may be based on one of the tests of steps 804, 806, 808, or 810, or may be based on multiple tests of steps 804, 806, 808, or 810.

At step 804, the input signal is analyzed to determine whether music is present in the input signal. The detection of music content may be accomplished according to several different music detection techniques. In one implementation, the music decision is made according to the music detection techniques described in U.S. Provisional Patent Application No. 61/599,767, which is incorporated herein by reference. In other implementations, other known music detection techniques are used to determine whether music content is present in the input signal. If music content is detected in the signal and the system elects to not continue with other tests, then step 804 proceeds to step 812 where the system will process the input signal and control the noise estimate adaptation with the system of FIG. 2. If a lack of music content is detected in the signal and the system elects to not continue with other tests, then step 804 proceeds to step 814 where the system will process the input signal and control the noise estimate adaptation with the feedback detection features of FIG. 7. Alternatively, the system may elect to conduct further tests, in which case step 804 proceeds to step 806.

At step 806, the input signal is analyzed to determine whether the input signal is wideband or narrowband. In one implementation, the system uses one or more predetermined thresholds to make the determination if the audio is wideband or narrowband. As one example, the system may determine that the signal is wideband if its sampling frequency is equal to or greater than 16 kHz, and may determine that the signal is narrowband when the sampling frequency of the signal is below 16 kHz. As another example, the system may determine that the signal is wideband if its sampling frequency is equal to or greater than 16 kHz, may determine that the signal is narrowband when the sampling frequency of the signal is at or below 8 kHz, and may rely on a different test when the signal is between 8 kHz and 16 kHz. If the signal is wideband and the system elects to not continue with other tests, then step 806 proceeds to step 812 where the system will process the input signal and control the noise estimate adaptation with the system of FIG. 2. If the signal is narrowband and the system elects to not continue with other tests, then step 806 proceeds to step 814 where the system will process the input signal and control the noise estimate adaptation with the feedback detection features of FIG. 7. Alternatively, the system may elect to conduct further tests, in which case step 806 proceeds to step 808.

At step 808, the system transmitter and/or receiver characteristics are analyzed to determine whether a codec capable of encoding/decoding music is used in the system. If the codec is capable of encoding/decoding music and the system elects to not continue with other tests, then step 808 proceeds to step 812 where the system will process the input signal and control the noise estimate adaptation with the system of FIG. 2. The codec capability test of 808 may also be used together with a wideband determination at step 806 to determine which processing system to use. For example, the system may choose the processing system of FIG. 2 when the signal is wideband and the codec is capable of encoding/decoding music. If the system determines that the codec is not capable of encoding/decoding music and the system elects to not continue with other tests, then step 808 proceeds to step 814 where the system will process the input signal and control the noise estimate adaptation with the feedback detection features of FIG. 7. Alternatively, the system may elect to conduct further tests, in which case step 808 proceeds to step 810.

At step 810, the system may perform one or more additional tests to help select which processing system to use to control the background noise estimate. Step 810 may also be based on a user preference. For example, the system may present the option to the user to either select the processing of FIG. 2 or the processing of FIG. 7. The user may select the processing of FIG. 2 when the user would like the ability to accurately transmit music content, but may select the processing of FIG. 7 when the user would like to focus on voice content and does not intend to transmit music content. If the system presents the user with the option to select the appropriate mode, then the system may execute the user preference test at step 810 without performing the additional processing of steps 804, 806, and 808.

Each of the processes described herein may be encoded in a computer-readable storage medium (e.g., a computer memory), programmed within a device (e.g., one or more circuits or processors), or may be processed by a controller or a computer. If the processes are performed by software, the software may reside in a local or distributed memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable storage medium," "machine-readable medium," "propagated-signal" medium, and/or "signal-bearing medium" may comprise a medium (e.g., a non-transitory medium) that stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a computer and/or machine memory.

While various embodiments, features, and benefits of the present system have been described, it will be apparent to those of ordinary skill in the art that many more embodiments, features, and benefits are possible within the scope of the disclosure. For example, other alternate systems may include any combinations of structure and functions described above or shown in the figures.

What is claimed is:

1. A noise estimation control method, comprising:
- receiving an input audio signal detected within a space;
- receiving a reference audio signal that is transmitted by a speaker as an aural signal into the space;
- processing the input audio signal and the reference audio signal by a signal processor to determine a coherence value based on an amount of the aural signal that is included in the input audio signal;
- determining whether the input audio signal satisfies a first criterion or a second criterion by processing the input audio signal by the signal processor executing a mode selection;
- determining a background noise level of the input audio signal; and
- calculating an amount to adjust a stored background noise estimate by the signal processor based on the coherence value and the background noise level of the input audio signal;
- where the first criterion and the second criterion enables storing the adjustment of the background noise estimate.

2. The method of claim 1, where the step of calculating the amount to adjust the stored background noise estimate comprises:
- determining an intended increase to the stored background noise estimate based on the background noise level in the input audio signal; and
- reducing the intended increase to the stored background noise estimate based on the coherence value to determine a reduced noise estimate adjustment.

3. The method of claim 2, further comprising adding the reduced noise estimate adjustment to the stored background noise estimate.

4. The method of claim 2, where the coherence value is a number between zero and one, and where the step of reducing the intended increase to the stored background noise estimate comprises setting the amount to adjust the stored background noise estimate according to:

$$A=B(1-C),$$

where A represents the amount to adjust the stored background noise estimate, B represents the intended increase to the stored background noise estimate based on the background noise level in the input audio signal, and C represents the coherence value.

5. The method of claim 1, where the step of processing comprises:

comparing the input audio signal to the reference audio signal;

determining a degree of similarity between the input audio signal and the reference audio signal; and setting the coherence value based on the degree of similarity between the input audio signal and the reference audio signal.

6. The method of claim 1, where the step of processing comprises:

determining a predicted echo signal based on a convolution between the reference audio signal and an echo cancellation filter;

comparing the input audio signal to the predicted echo signal;

determining a degree of similarity between the input audio signal and the predicted echo signal; and setting the coherence value based on the degree of similarity between the input audio signal and the predicted echo signal.

7. The method of claim 1, where the step of processing comprises:

dividing the input audio signal into a plurality of frequency bands, where a first frequency band of the plurality of frequency bands comprises a plurality of frequency bins;

determining a first bin coherence value for a first frequency bin of the plurality of frequency bins based an amount of the aural signal that is included in the first frequency bin;

determining a second bin coherence value for a second frequency bin of the plurality of frequency bins based an amount of the aural signal that is included in the second frequency bin; and averaging the first bin coherence value with the second bin coherence value and any other bin coherence values associated with the plurality of frequency bins to determine a band coherence value for the first frequency band.

8. The method of claim 7, where the step of calculating the amount to adjust the stored background noise estimate comprises calculating an amount to adjust the stored background noise estimate in a frequency band that corresponds to the first frequency band of the input audio signal based on a background noise level in the first frequency band and the band coherence value for the first frequency band.

9. The method of claim 1, further comprising suppressing noise in the input audio signal based on the stored background noise estimate to generate an output signal with reduced noise content.

10. A noise estimation control system, comprising:

a computer processor;

an input interface configured to receive a reference audio signal from a remote communication device that is transmitted by a speaker as an aural signal into a space;

a noise feedback detection module executable by the computer processor to process the reference audio signal and determine a coherence value across an audible frequency range based on an amount of the aural signal that is included in an input audio signal detected within the space; and a background noise estimation module executable by the computer processor to determine and store in memory a background noise level of the input audio signal;

a mode selection module executable by the computer processor to analyze the input audio signal to determine whether the input audio signal satisfies a first criterion or a second criterion;

where the background noise estimation module is executable by the computer processor to calculate an amount to adjust a stored background noise estimate based on the coherence value and the background noise level of the input audio signal;

where the mode selection module enable the background noise estimation module to store the adjusted background noise estimate in response to a determination by the mode selection module that the input audio signal satisfies the first criterion or the second criterion.

11. The system of claim 10, where the background noise estimation module is configured to determine an intended increase to the stored background noise estimate based on the background noise level in the input audio signal, and reduce the intended increase to the stored background noise estimate based on the coherence value to determine a reduced noise estimate adjustment.

12. The system of claim 11, where the background noise estimation module is configured to add the reduced noise estimate adjustment to the stored background noise estimate.

13. The system of claim 11, where the coherence value is a number between zero and one, and where the background noise estimation module is configured to reduce the intended increase to the stored background noise estimate by setting the amount to adjust the stored background noise estimate according to:

$$A=B(1-C),$$

where A represents the amount to adjust the stored background noise estimate, B represents the intended increase to the stored background noise estimate based on the background noise level in the input audio signal, and C represents the coherence value.

14. The system of claim 10, where the noise feedback detection module is configured to compare the input audio signal to the reference audio signal, determine a degree of similarity between the input audio signal and the reference audio signal, and set the coherence value based on the degree of similarity between the input audio signal and the reference audio signal.

15. The system of claim 10, where the noise feedback detection module is configured to determine a predicted echo signal from a convolution between the reference audio signal and an echo cancellation filter, compare the input audio signal to the predicted echo signal, determine a degree of similarity between the input audio signal and the predicted echo signal, and set the coherence value based on the degree of similarity between the input audio signal and the predicted echo signal.

16. The system of claim 10, where the noise feedback detection module is configured to divide the input audio signal into a plurality of frequency bands, where a first frequency band of the plurality of frequency bands comprises a plurality of frequency bins; and where the noise feedback detection module is further configured to determine a first bin coherence value for a first frequency bin of the plurality of frequency bins based an amount of the aural signal that is included in the first frequency bin, determine a second bin coherence value for a second frequency bin of the plurality of frequency bins based an amount of the aural signal that is included in the second frequency bin, and average the first bin coherence value with the second bin coherence value and any other bin coherence values associated with the plurality of frequency bins to determine a band coherence value for the first frequency band.

17. The system of claim 16, where the noise feedback detection module is further configured to calculate an amount to adjust the stored background noise estimate in a frequency band that corresponds to the first frequency band of the input audio signal based on a background noise level in the first frequency band and the band coherence value for the first frequency band.

18. The system of claim 10, further comprising a noise suppression module executable by the computer processor to suppress noise in the input audio signal based on the stored background noise estimate to generate an output signal with reduced noise content.

19. A noise estimation control system, comprising:

a computer processor;

an input interface configured to receive a reference audio signal that is transmitted by a speaker as an aural signal into a space;

a background noise estimation module executable by the computer processor to determine a background noise level of an input audio signal detected within the space;

a voice activity detection module executable by the computer processor to determine whether the input audio signal includes speech content;

a noise feedback detection module executable by the computer processor to process the input audio signal and the reference audio signal to determine a coherence value across an audible frequency range based on an amount of the aural signal that is included in the input audio signal; and a mode selection module executable by the computer processor to analyze the input audio signal to determine whether the input audio signal satisfies a first criterion or a second criterion;

where the mode selection module is configured to select the voice activity detection module and enable the background noise estimation module to adjust a stored background noise estimate based on the background noise level of the input audio signal and a voice detection output of the voice activity detection module in response to a determination by the mode selection module that the input audio signal satisfies the first criterion; and where the mode selection module is configured to select the noise feedback detection module and enable the background noise estimation module to adjust the stored background noise estimate based on the background noise level of the input audio signal and the coherence value in response to a determination by the mode selection module that the input audio signal satisfies the second criterion.

20. The system of claim 19, where the second criterion is satisfied when the mode selection module identifies music content in the input audio signal, and where first criterion is satisfied when the mode selection module identifies a lack of music content in the input audio signal.

* * * * *